US011629457B2

(12) United States Patent
Yanagisawa et al.

(10) Patent No.: US 11,629,457 B2
(45) Date of Patent: Apr. 18, 2023

(54) AUTOMOBILE INSTRUMENT PANEL SURFACE MATERIAL AND METHOD OF MANUFACTURING SAME

(71) Applicant: Toray Industries, Inc., Tokyo (JP)

(72) Inventors: Satoshi Yanagisawa, Osaka (JP); Akihiro Tanabe, Gifu (JP); Makoto Nishimura, Otsu (JP)

(73) Assignee: Toray Industries, Inc., Tokyo (JP)

( * ) Notice: Subject to any disclaimer, the term of this patent is extended or adjusted under 35 U.S.C. 154(b) by 389 days.

(21) Appl. No.: 16/312,856

(22) PCT Filed: Jun. 22, 2017

(86) PCT No.: PCT/JP2017/023096
§ 371 (c)(1),
(2) Date: Dec. 21, 2018

(87) PCT Pub. No.: WO2018/003666
PCT Pub. Date: Jan. 4, 2018

(65) Prior Publication Data
US 2019/0323170 A1  Oct. 24, 2019

(30) Foreign Application Priority Data
Jun. 29, 2016 (JP) .............................. JP2016-128635

(51) Int. Cl.
| | |
|---|---|
| *D06N 3/00* | (2006.01) |
| *D06N 3/14* | (2006.01) |
| *B32B 15/08* | (2006.01) |
| *B65D 25/14* | (2006.01) |
| *D06N 3/18* | (2006.01) |
| *D06P 1/20* | (2006.01) |
| *B60K 37/00* | (2006.01) |
| *B60R 13/02* | (2006.01) |

(52) U.S. Cl.
CPC ............. *D06N 3/0004* (2013.01); *D06N 3/14* (2013.01); *B32B 15/08* (2013.01); *B65D 25/14* (2013.01); *D06N 3/18* (2013.01); *D06P 1/20* (2013.01)

(58) Field of Classification Search
None
See application file for complete search history.

(56) References Cited

U.S. PATENT DOCUMENTS

| | | | |
|---|---|---|---|
| 2003/0037381 A1 | 2/2003 | Hashimoto et al. | |
| 2007/0032156 A1 | 2/2007 | Bianco et al. | |
| 2010/0105265 A1 * | 4/2010 | Ueno ..................... | C08G 18/44 427/389.9 |
| 2015/0017854 A1 * | 1/2015 | Jung ....................... | D06N 3/183 442/72 |
| 2016/0002846 A1 * | 1/2016 | Yoshimoto ........... | D06N 3/0061 428/151 |
| 2016/0137814 A1 * | 5/2016 | Otero Martinez . | C08G 18/2885 524/99 |

FOREIGN PATENT DOCUMENTS

| | | | |
|---|---|---|---|
| CN | 103437193 A | 12/2013 | |
| CN | 104788720 A | 7/2015 | |
| EP | 2474663 A1 * | 7/2012 | ............... D06N 3/00 |
| JP | 57-174242 A | 11/1982 | |
| JP | 02-277891 A * | 11/1990 | ............... D06N 3/14 |
| JP | 2-277891 A | 11/1990 | |
| JP | 2000-45186 A | 2/2000 | |
| JP | 2001-081310 * | 3/2001 | ............. C08L 75/00 |
| JP | 2005-009054 A | 1/2005 | |
| JP | 2006-290961 A | 10/2006 | |
| JP | 2007-16378 A | 1/2007 | |
| JP | 2007-262627 A | 10/2007 | |
| JP | 4188127 B2 | 11/2008 | |
| JP | 4304013 B2 | 7/2009 | |
| JP | 2011-523985 A | 8/2011 | |
| KR | 2015-0076558 A | 7/2015 | |
| WO | 2009/150681 | 12/2009 | |

OTHER PUBLICATIONS

Handbook of UV Degradation and Stabilization, ChemTec Publishing, 2nd Ed., p. 75, 2015 (Year: 2015).*
"New Ultraviolet absorber "Tinuvin 1577FF"", *JETI*, 1997, vol. 45, No. 5, pp. 111-112, including an English translation.
The Extended European Search Report dated Feb. 7, 2020, of counterpart European Application No. 17820023.4.
The First Office Action dated Aug. 25, 2020, of counterpart Chinese Application No. 201780039362.3, along with an English translation.

* cited by examiner

*Primary Examiner* — Frank J Vineis
*Assistant Examiner* — Nicole T Gugliotta
(74) *Attorney, Agent, or Firm* — DLA Piper LLP (US)

(57) ABSTRACT

An automobile instrument panel surface material includes a microfiber having an average single fiber diameter of 0.3 to 7 μm; and polyurethane, the automobile instrument panel surface material having nap formed of the microfiber, the automobile instrument panel surface material having, of light fastnesses measured according to a light fastness measurement method of JIS L 0843:2006 under conditions of a xenon arc intensity of 110 MJ/m2, a fading by gray scale evaluation of grade 3.5 or higher, the automobile instrument panel surface material having a glass haze of 10.0% or less as measured according to a glass haze evaluation method of ISO 6452:2007 under conditions of a heating temperature of 100° C. and a heating time of 20 hours.

6 Claims, No Drawings

AUTOMOBILE INSTRUMENT PANEL SURFACE MATERIAL AND METHOD OF MANUFACTURING SAME

TECHNICAL FIELD

This disclosure relates to an automobile instrument panel surface material having an elegant appearance and a soft touch of nap, and a method of manufacturing the same.

BACKGROUND

Automobile instrument panel surface materials have been mainly made from a polyvinyl chloride resin and a polyolefin resin from the viewpoint of durability. Instrument panels made from resins, however, have a hard touch and a commonplace appearance, and do not exhibit elegance. In recent years, due to diversification of automobile interiors, a napped instrument panel surface material having an elegant appearance and a soft touch is desired.

As such a material having an elegant appearance and a soft touch, there are vehicle interior materials made of microfibers. Although such materials can be used for vehicle seats and doors, materials made of common microfibers cannot be used for instrument panels because the instrument panels are required to have durability against intense light due to the influence of direct sunlight. In addition, because instrument panels are heated to high temperatures due to the influence of direct sunlight, if the instrument panels contain a substance that is volatilized at high temperatures, there may be a situation of fogging of the windshield. Therefore, it has been impossible to use a resin or a fiber processing agent having no resistance to high temperatures There has been disclosed an automobile interior material that contains a microfiber and an elastomer, and is produced by adding, as a binder, a blend of low-molecular-weight polyurethane and a silicone resin to at least a surface of a microfiber napped sheet to improve light fastness (see Japanese Patent No. 4188127).

In addition, a suede-like artificial leather containing a hindered amine light stabilizer is disclosed as a low-fogging automobile interior material (see Japanese Patent No. 4304013). In addition, genuine leather is sometimes used as an instrument panel surface material.

The automobile interior material described in JP 4188127 has a problem that when it is used as an automobile interior surface material at a place that gets intense direct sunlight as in an instrument panel, it may be discolored and faded by light and incapable of withstanding practical use.

Further, the automobile interior material described in JP 4304013 has a problem that it causes fogging when the content of the hindered amine light stabilizer is more than 5% by mass, and that it does not have light resistance as an instrument panel surface material when the content of the hindered amine light stabilizer is 5% by mass or less.

In addition, genuine leather has poor durability against sunlight, and there has been no surface material having nap and a soft touch.

That is, at present, there is no automobile instrument panel surface material that has durability against direct sunlight and also has an elegant appearance and a soft touch of nap.

It could therefore be helpful to provide an automobile instrument panel surface material having durability against direct sunlight and also an elegant appearance and a soft touch of nap, and a method of manufacturing the same. The "instrument panel" refers to a front surface portion of an automobile interior material, and includes a plane that is perpendicular or substantially perpendicular to the ground surface. For example, the instrument panel includes the periphery of meters and gauges as well as a panel portion surrounding the meters and gauges.

SUMMARY

We thus provide:

An automobile instrument panel surface material contains: a microfiber having an average single fiber diameter of 0.3 to 7 µm; and polyurethane, and the automobile instrument panel surface material has nap formed of the microfiber, has, of light fastnesses measured according to a light fastness measurement method of JIS L 0843:2006 under conditions of a xenon arc intensity of 110 MJ/m$^2$, a fading by gray scale evaluation of grade 3.5 or higher, and has a glass haze of 10.0% or less as measured according to a glass haze evaluation method of ISO 6452:2007 under conditions of a heating temperature of 100° C. and a heating time of 20 hours.

Further, preferably, the polyurethane is polycarbonate polyurethane.

Further, preferably, the polyurethane contains a UV absorber having a vapor pressure of 5.0×10 E-6 Pa or less at 20° C., and the automobile instrument panel surface material has a content of the UV absorber of 0.01 to 5% by mass in mass percentage relative to the polyurethane. Further, according to a preferable aspect of the automobile instrument panel surface material of the present invention, the polyurethane contains a UV absorber having a vapor pressure of 5.0×10 E-6 Pa or less at 20° C., and the automobile instrument panel surface material has a content of the UV absorber of 0.01 to 5% by mass in mass percentage relative to the polyurethane.

Further, the UV absorber may have a vapor pressure of 1.0×10 E-7 Pa or less at 20° C.

Further, the automobile instrument panel surface material may contain 0.01 to 5% by mass of a silicone oil in mass percentage relative to the total mass of the microfiber and the polyurethane.

The method of manufacturing the automobile instrument panel surface material includes the steps of: adding a UV absorber having a vapor pressure of 1.0×10 E-7 Pa or less at 20° C. to the polyurethane; a polyurethane impregnating and adding step of impregnating and adding, to a fibrous base material containing a microfiber, the polyurethane containing the UV absorber added thereto; and after the polyurethane impregnating and adding step, adding, to the fibrous base material to which the polyurethane is impregnated and added, a silicone oil in an amount of 0.01 to 5% by mass in mass percentage relative to the total mass of the microfiber and the polyurethane, and the automobile instrument panel surface material has a content of the UV absorber of 0.01 to 5% by mass in mass percentage relative to the polyurethane.

It is thus possible to provide an automobile instrument panel surface material having an elegant appearance and a soft touch of nap.

DETAILED DESCRIPTION

The automobile instrument panel surface material contains: a microfiber having an average single fiber diameter of 0.3 to 7 µm; and polyurethane, and the automobile instrument panel surface material has nap formed of the microfiber, has, of light fastnesses measured according to a light fastness measurement method of JIS L 0843:2006 under conditions of a xenon arc intensity of 110 MJ/m$^2$, a fading by gray scale evaluation of grade 3.5 or higher, and has a glass haze of 10.0% or less as measured according to a glass haze evaluation method of ISO 6452:2007 under conditions of a heating temperature of 100° C. and a heating time of 20 hours.

Examples of the microfiber include fibers made from melt-spinnable thermoplastic resins including polyesters such as polyethylene terephthalate, polybutylene terephthalate, polytrimethylene terephthalate, and polylactic acid, polyamides such as 6-nylon and 66-nylon, polyolefins such as polyacrylic, polyethylene, and polypropylene, and thermoplastic cellulose. Among them, a polyester fiber is preferably used from the viewpoint of strength, dimensional stability, and light resistance. In addition, the fibrous base material can also be formed of a mixture of fibers made from different materials.

The cross-sectional shape of the microfiber may be round. It is also possible to employ a fiber having a modified cross-section such as polygonal cross-sections including elliptical, flat, and triangular cross-sections, fan-shaped cross-sections, and cross-shaped cross-sections.

The fiber that constitutes the fibrous base material containing the microfiber has an average single fiber diameter of 0.3 to 7 μm. When the fiber has an average single fiber diameter of 7 μm or less, more preferably 6 μm or less, still more preferably 5 μm or less, it is possible to provide an instrument panel surface material excellent in flexibility and nap quality. On the other hand, when the fiber has an average single fiber diameter of 0.3 μm or more, more preferably 0.7 μm or more, still more preferably 1.0 μm or more, it is possible to provide a surface material that is excellent in coloring properties after dyeing as well as in dispersibility of the bundled fiber during napping by polishing with sandpaper or the like, has a soft texture, and is excellent in surface touch.

In addition, if the average single fiber diameter of the fiber exceeds 7 μm, an excellent surface touch is not obtained, and the texture of the instrument panel surface material is hardened. If the average single fiber diameter of the fiber is less than 0.3 μm, the fiber is weak, the napping is poor, and good surface quality is not obtained.

The average single fiber diameter of the fiber that constitutes the fibrous base material can be determined as follows. That is, when the cross-sectional shape of the fiber is a circle or an ellipse close to a circle, a scanning electron microscope (SEM) photograph of a surface of the surface material is taken at a magnification of 2000 times, 100 pieces of the fiber are randomly selected, the single fiber diameters of the pieces are measured, and the average single fiber diameter is calculated from the single fiber diameters.

The form of the surface material made of the microfiber may be a nonwoven fabric or the like. A nonwoven fabric is preferable because the nonwoven fabric as the surface material has good surface quality after being subjected to surface napping treatment.

The nonwoven fabric used may be either a short fiber nonwoven fabric or a long fiber nonwoven fabric. A short fiber nonwoven fabric is preferably used from the viewpoint of texture and quality.

The fiber length of the short fiber in the short fiber nonwoven fabric is preferably 25 to 90 mm. When the fiber length is 25 mm or more, it is possible to obtain a surface material excellent in abrasion resistance by entanglement. Further, when the fiber length is 90 mm or less, it is possible to obtain an instrument panel surface material better in texture and quality. The fiber length is more preferably 35 mm or more, particularly preferably 40 mm or more. In addition, the fiber length is more preferably 80 mm or less, particularly preferably 70 mm or less.

When the nonwoven fabric is made of a microfiber, in a preferable aspect, the nonwoven fabric has a structure in which bundles of pieces of the microfiber (microfiber bundles) are entangled with each other. The entanglement of pieces of the microfiber in a bundle state improves the strength of the instrument panel surface material. The nonwoven fabric according to the above-mentioned aspect can be obtained by preliminarily entangling pieces of microfiber-generating fiber with each other to form a fibrous base material sheet, and then generating a microfiber from the microfiber-generating fiber.

When a microfiber or microfiber bundles constitute a nonwoven fabric, it is possible to insert a woven fabric or a knitted fabric into the nonwoven fabric for the purpose of improving the strength and/or suppressing dimensional change during processing. In this case, the woven fabric structure may be plain weave, twill weave, satin weave or the like, and is preferably plain weave from the viewpoint of cost. Examples of the knitted fabric structure include circular knit, tricot, and Russell. The fiber that constitutes the woven fabric or knitted fabric preferably has an average single fiber diameter of about 0.3 to 10 μm.

The polyurethane resin may be polyurethane dissolved in a solvent or water-dispersible polyurethane. For example, a solution type polyurethane resin ("CRISVON" (registered trademark) MP-812NB manufactured by DIC Corporation) and an aqueous polyurethane resin ("HYDRAN" (registered trademark) WLI-602 manufactured by DIC Corporation) can be used.

In the surface material, the percentage of the polyurethane based on the mass of the surface material is preferably 3% by mass or more and 80% by mass or less. The percentage is more preferably 15% by mass or more and 55% by mass or less. When the percentage of the polyurethane is 3% by mass or more, it is possible to obtain the strength of the sheet and easily prevent the fiber from coming off. When the percentage of the polyurethane is 80% by mass or less, it is possible to prevent the hardening of the texture and to obtain a satisfactory texture.

The polyurethane is preferably polyurethane obtained by a reaction of a polymer diol, an organic diisocyanate, and a chain extender.

As the polymer diol, for example, a polycarbonate diol, a polyester diol, a polyether diol, a silicone diol, and a fluorine diol can be used, and a copolymer of these compounds can also be used. From the viewpoint of hydrolysis resistance, a polycarbonate diol and a polyether diol are preferably used. From the viewpoint of light resistance and heat resistance, a polycarbonate diol and a polyester diol are preferably used. Further, from the viewpoint of balance among the hydrolysis resistance, heat resistance, and light resistance, a polycarbonate diol is preferably used. If a diol having low hydrolysis resistance, low heat resistance, and low light resistance is used, the polyurethane is deteriorated due to sunlight, the surface of the surface material is roughened due to friction by human hands, and in severe cases, pilling occurs, and the surface material does not endure long-term use.

The polycarbonate diol can be produced by a transesterification reaction of an alkylene glycol with a carbonate ester, a reaction of phosgene or a chloroformate ester with an alkylene glycol or the like.

Examples of the alkylene glycol include linear alkylene glycols such as ethylene glycol, propylene glycol, 1,4-butanediol, 1,5-pentanediol, 1,6-hexanediol, 1,9-nonanediol, and 1,10-decanediol, branched alkylene glycols such as neopentyl glycol, 3-methyl-1,5-pentanediol, 2,4-diethyl-1,5-pentanediol, and 2-methyl-1,8-octanediol, alicyclic diols such as 1,4-cyclohexanediol, aromatic diols such as bisphenol A, and glycerin, trimethylolpropane, and pentaerythritol. The polycarbonate diol may be either a polycarbonate diol obtained from a single alkylene glycol or a copolymerized polycarbonate diol obtained from two or more alkylene glycols.

Examples of the polyester diol include various polyester diols obtained by condensation of low-molecular-weight polyols with polybasic acids.

The low-molecular-weight polyol used may be one or a combination of two or more selected from ethylene glycol, 1,2-propylene glycol, 1,3-propylene glycol, 1,3-butanediol, 1,4-butanediol, 2,2-dimethyl-1,3-propanediol, 1,6-hexanediol, 3-methyl-1,5-pentanediol, 1,8-octanediol, diethylene glycol, triethylene glycol, dipropylene glycol, tripropylene glycol, 1,4-cyclohexanediol, and 1,4-cyclohexanedimethanol. Adducts obtained by adding various alkylene oxides to bisphenol A can also be used.

The polybasic acid may be one or a combination of two or more selected from succinic acid, maleic acid, adipic acid, glutaric acid, pimelic acid, suberic acid, azelaic acid, sebacic acid, dodecanedicarboxylic acid, phthalic acid, isophthalic acid, terephthalic acid, and hexahydroisophthalic acid.

Examples of the polyether diol include polyethylene glycol, polypropylene glycol, polytetramethylene glycol, and a copolymerized diol combining these.

The number average molecular weight of the polymer diol is preferably 500 to 4000. When the number average molecular weight is 500 or more, more preferably 1500 or more, hardening of the texture can be prevented. When the number average molecular weight is 4000 or less, more preferably 3000 or less, strength of the polyurethane can be maintained.

Examples of the organic diisocyanate include aliphatic diisocyanates such as hexamethylene diisocyanate, dicyclohexylmethane diisocyanate, isophorone diisocyanate, and xylylene diisocyanate, and aromatic diisocyanates such as diphenylmethane diisocyanate and tolylene diisocyanate. These compounds can also be used in combination. Among them, aliphatic diisocyanates such as hexamethylene diisocyanate, dicyclohexylmethane diisocyanate, and isophorone diisocyanate are preferably used from the viewpoint of light resistance.

Examples of the usable chain extender include amine chain extenders such as ethylenediamine and methylenebisaniline, and diol chain extenders such as ethylene glycol. A polyamine obtained by reacting a polyisocyanate with water can also be used as a chain extender.

The polyurethane can also contain a crosslinking agent for the purpose of improving water resistance, abrasion resistance, hydrolysis resistance and the like. The crosslinking agent may be an external crosslinking agent that is added as a third component to the polyurethane resin, or an internal crosslinking agent that introduces reaction points to form a crosslinked structure in advance into the polyurethane molecular structure. It is preferable to use an internal crosslinking agent from the viewpoint that crosslinking points can be formed more uniformly in the polyurethane molecular structure and that the decrease in flexibility can be mitigated.

The crosslinking agent used may be a compound having an isocyanate group, an oxazoline group, a carbodiimide group, an epoxy group, a melamine resin, a silanol group and the like. If the crosslinking proceeds excessively, however, the polyurethane is cured to tend to harden the texture of the instrument panel surface material. Thus, a compound having a silanol group is preferably used from the viewpoint of balance between reactivity and flexibility.

Further, the polyurethane can contain a hydrophilic group in the molecular structure. When the polyurethane has a hydrophilic group in the molecular structure, in use as a water-dispersible polyurethane resin, the dispersibility and stability of the water-dispersible polyurethane resin can be improved.

Examples of the usable hydrophilic group include cationic hydrophilic groups such as a quaternary amine salt, anionic hydrophilic groups such as a sulfonate salt and a carboxylate salt, nonionic hydrophilic groups such as polyethylene glycol, combinations of a cationic hydrophilic group and a nonionic hydrophilic group, and combinations of an anionic hydrophilic group and a nonionic hydrophilic group. Among them, a nonionic hydrophilic group that causes no concern about yellowing due to light or an adverse effect by a neutralizing agent is particularly preferably used.

More specifically, an anionic hydrophilic group requires a neutralizing agent, and when the neutralizing agent is, for example, a tertiary amine such as ammonia, triethylamine, triethanolamine, triisopropanolamine, trimethylamine, or dimethylethanolamine, an amine is generated and volatilized by heat during film formation and drying, and the amine is released to the outside of the system. Therefore, to suppress release of the amine into the atmosphere and deterioration of the working environment, a device for recovering the volatilized amine has to be introduced. Moreover, if the amine is not volatilized by heating and remains in the instrument panel surface material as the final product, the amine may be discharged to the environment at the time of incineration of the product, for example. In contrast, in a nonionic hydrophilic group, no amine recovery device is required since no neutralizing agent is used, and there is also no concern that the amine may remain in the instrument panel surface material.

Moreover, when the neutralizing agent is a hydroxide of an alkali metal or an alkaline earth metal such as sodium hydroxide, potassium hydroxide, and calcium hydroxide, the polyurethane moiety shows alkalinity when being wetted with water. In a nonionic hydrophilic group, however, there is no need to worry about deterioration of the polyurethane resin due to hydrolysis because no neutralizing agent is used.

The polyurethane resin may contain various additives including pigments such as carbon black; flame retardants such as phosphorus, halogen, silicone, and inorganic flame retardants; antioxidants such as phenolic, sulfur, and phosphorus antioxidants; ultraviolet absorbers such as benzotriazole, benzophenone, salicylate, cyanoacrylate, and oxanilide ultraviolet absorbers; light stabilizers such as hindered amine and benzoate light stabilizers; hydrolysis stabilizers such as polycarbodiimide; plasticizers; antistatic agents; surfactants; softening agents; water repellent agents; coagulation modifiers; dyes; antiseptics; antibacterial agents; deodorants; fillers such as cellulose particles; and inorganic particles such as silica and titanium oxide.

It is important that the instrument panel surface material have, of light fastnesses measured according to a light fastness measurement method of JIS L 0843:2006 under conditions of a xenon arc intensity of 110 MJ/m$^2$, a fading by gray scale evaluation of grade 3.5 or higher. If the fading is lower than grade 3.5, discoloration and fading will occur due to sunlight in actual use, and a problem of color change will occur only at a place that gets sunlight. The light fastness of the instrument panel surface material is preferably grade 4.0 or higher, more preferably grade 4.5 or higher.

It is also important that the instrument panel surface material have a glass haze of 10.0% or less as measured according to a glass haze evaluation method of ISO 6452: 2007 under conditions of a heating temperature of 100° C. and a heating time of 20 hours. If the glass haze is more than 10.0%, fogging of the windshield occurs in actual use, which is dangerous because the front visibility is not ensured during driving. The glass haze is preferably 6.5% or less, more preferably 5% or less.

The polyurethane contained in the instrument panel surface material preferably contains a UV absorber having a vapor pressure of 5.0×10 E-6 Pa or less at 20° C. In the absence of a UV absorber, the polyurethane is deteriorated due to sunlight, the surface of the surface material is roughened due to friction by human hands and, in severe cases, pilling occurs, and the surface material may not endure long-term use. In addition, discoloration and fading will occur due to sunlight, and a problem of color change may occur only at a place that gets sunlight. In addition, the UV absorber preferably has a vapor pressure of 5.0×10 E-6 Pa or less at 20° C. If the vapor pressure at 20° C. is higher than 5.0×10 E-6 Pa, the UV absorber volatilizes when the instrument panel surface material gets sunlight, and as with the case where the polyurethane does not contain the UV absorber, the polyurethane may be deteriorated and may not endure long-term use. The vapor pressure of the UV absorber at 20° C. is preferably 1.0×10 E-6 Pa or less, more preferably 5.0×10 E-7 Pa or less.

The amount of the UV absorber added to the polyurethane is preferably 0.01% by mass or more and 5% by mass or less in mass percentage relative to the polyurethane. If the amount of the UV absorber is less than 0.01% by mass, a sufficient effect of absorbing ultraviolet rays cannot be obtained, and the polyurethane may be deteriorated. If the amount of the UV absorber exceeds 5% by mass, the flexible texture of the polyurethane is impaired, and not only the touch of the surface of the instrument panel surface material may be deteriorated but also the possibility of occurrence of glass haze may be increased. The amount of the UV absorber added is preferably 0.05% by mass or more, more preferably 0.10% by mass or more. The amount of the UV absorber added is preferably 4.5% by mass or less, more preferably 4.0% by mass or less.

The instrument panel surface material preferably contains 0.01% by mass or more and 5% by mass or less of a silicone oil in mass percentage relative to the total mass of the microfiber and the polyurethane. When the surface of the polyurethane containing a UV absorber is coated with a silicone oil, volatilization of the UV absorber from the inside of the polyurethane can be suppressed when the instrument panel surface material gets sunlight in actual use. If the content of the silicone oil is less than 0.01% by mass, volatilization of the UV absorber cannot be suppressed, and not only the polyurethane may be deteriorated but also the glass haze may occur. If the content of the silicone oil is more than 5% by mass, the surface of the instrument panel surface material has a strong oily feeling, the good surface touch of the microfiber is impaired, and the surface touch of the instrument panel surface material may be deteriorated. The content of the silicone oil is preferably 0.05% by mass or more, more preferably 0.10% by mass or more. The content of the silicone oil is preferably 4.5 by mass or less, more preferably 4.0% by mass or less.

A method of manufacturing the surface material will be described. The manufacturing method is a method for manufacturing an automobile instrument panel surface material that contains a microfiber having an average single fiber diameter of 0.3 to 7 μm, and polyurethane, and that has nap formed of the microfiber. The manufacturing method includes: adding a UV absorber having a vapor pressure of 1.0×10 E-7 Pa or less at 20° C. to the polyurethane; impregnating and adding, to a fibrous base material containing a microfiber, the polyurethane containing the UV absorber added thereto; and after impregnation and adding of the polyurethane, adding, to the fibrous base material to which the polyurethane is impregnated and added, a silicone oil in an amount of 0.01 to 5% by mass in mass percentage relative to the total mass of the microfiber and the polyurethane, and the automobile instrument panel surface material has a content of the UV absorber of 0.01 to 5% by mass in mass percentage relative to the polyurethane.

In the surface material, polyurethane is added to a fibrous base material containing a microfiber. A means of forming the microfiber of the fibrous base material is preferably a microfiber-generating fiber. Use of the microfiber-generating fiber makes it possible to stably obtain a form in which microfiber bundles are entangled with each other.

The microfiber-generating fiber may be a sea-island type fiber produced from two thermoplastic resins different in solubility in a solvent as a sea component and an island component, and that is produced by dissolving and removing the sea component using a solvent or the like to allow the remaining island component to form a microfiber; or a splittable type composite fiber that is produced by alternately disposing two thermoplastic resins radially or in layers in the cross-section of the fiber, and splitting and separating the components to form a microfiber. In particular, the sea-island type fiber is preferably used from the viewpoint of flexibility and texture of the instrument panel surface material since moderate voids can be produced between the islands, that is, between pieces of the microfiber by removal of the sea component.

Examples of the sea-island type fiber include a sea-island type composite fiber obtained by alternately arranging and spinning two components of a sea component and an island component using a sea-island type composite spinneret, and a mixed spun fiber obtained by mixing and spinning two components of a sea component and an island component. A sea-island type composite fiber is preferably used from the viewpoint that a microfiber having a uniform fineness can be obtained, and that a microfiber of a sufficient length can be obtained to contribute to the strength of the instrument panel surface material.

As the sea component of the sea-island type fiber, for example, a copolymerized polyester obtained by copolymerizing polyethylene, polypropylene, polystyrene, sodium sulfoisophthalic acid, polyethylene glycol or the like, and polylactic acid can be used. Among them, a copolymerized polyester obtained by copolymerizing alkali-decomposable sodium sulfoisophthalic acid, polyethylene glycol or the like, and polylactic acid, which can be decomposed without the use of an organic solvent, are preferable from the viewpoint of environmental consideration.

The sea component removal treatment when the sea-island type fiber is used is preferably performed before the addition of polyurethane to the fibrous base material. If the sea component removal treatment is performed after the addition of polyurethane to the fibrous base material, the polyurethane is present between pieces of the microfiber, and it may be impossible to uniformly disperse pieces of the microfiber. On the other hand, if the sea component removal treatment is performed before the addition of polyurethane to the fibrous base material, good surface quality is obtained because the fiber is uniformly dispersed, and unevenness of the surface touch is easily eliminated. Moreover, since the polyurethane is directly adhered to the microfiber and the microfiber can be strongly gripped, the abrasion resistance of the instrument panel surface material is improved.

The sea component removal treatment can be performed by immersing the sea-island type fiber in a solvent and squeezing out the liquid, or a method of adding a solvent necessary for sea component removal to the fibrous base material, followed by heat treatment, and removing the sea component by washing, for example. A usable solvent that dissolves the sea component may be an organic solvent such as toluene or trichlorethylene when the sea component is polyethylene, polypropylene, or polystyrene, or may be an alkaline aqueous solution such as a solution of sodium hydroxide when the sea component is a copolymerized polyester or polylactic acid. From the viewpoint of environmental consideration of the process, sea component removal treatment with an alkaline aqueous solution such as a solution of sodium hydroxide is preferable.

Prior to development of the microfiber, a water-soluble resin such as polyvinyl alcohol can be added as a temporary reinforcing material to the fibrous base material. The reinforcing material is not particularly limited as long as it can temporarily keep the shape of a sheet, but is preferably a reinforcing material that can be extracted and removed after the addition of polyurethane. It is also possible to add a water-soluble resin to the fibrous base material after development of the microfiber. Adding a water-soluble resin after development of the microfiber may have an effect of making the texture flexible.

The method of adding polyurethane to the fibrous base material is preferably a method of impregnating a polyurethane solution into the fibrous base material. Impregnating and adding the polyurethane solution to the fibrous base material can add polyurethane to every corner of the fibrous base material so that the surface quality of the surface material is made more uniform. Examples of the method of coagulating polyurethane include: a wet coagulation method of immersing, after the impregnation, the fibrous base material in an aqueous solution or an aqueous organic solvent solution to coagulate the polyurethane; a dry coagulation method of drying, after impregnating the polyurethane solution into the fibrous base material, the polyurethane solution to coagulate the polyurethane; and a method of thermally coagulating, after impregnating the polyurethane solution into the fibrous base material, the polyurethane by wet heat treatment.

Examples of the solvent used in the polyurethane solution include N,N-dimethylformamide, dimethylsulfoxide, methyl ethyl ketone, and water. Moreover, pigments, antioxidants and the like may be added to the elastomer solution, if necessary.

It is important to add a UV absorber having a vapor pressure of $1.0 \times 10 \text{ E-7}$ Pa or less at 20° C. to the polyurethane solution. It is preferable that the UV absorber be dissolved or dispersed in the polyurethane solution and be allowed to be present inside the coagulated polyurethane during coagulation of the polyurethane. If a UV absorber is added after coagulation of the polyurethane, the UV absorber adheres to the surface of the coagulated polyurethane and only a short-term UV absorption effect can be obtained, and sufficient long-term light resistance cannot be obtained.

Further, it is preferable to add a silicone oil to the sheet obtained by impregnating the polyurethane into the fibrous base material and coagulating the polyurethane. Covering the surface of the coagulated polyurethane containing the UV absorber inside with the silicone oil prevents bleeding of the UV absorber from the inside of the coagulated polyurethane when the temperature rises due to sunlight, and provides sufficient longer-term light resistance. Examples of the method of adding the silicone oil include a method of impregnating a sheet with a silicone oil liquid, a method of spraying a silicone oil liquid by spraying, and a method of impregnating a sheet with a liquid containing a silicone oil or immersing a sheet in such a liquid after the napping treatment or dyeing described later. To add the silicone oil more uniformly, a method of impregnating a sheet with a silicone oil liquid to add the silicone oil is preferable.

The silicone oil is preferably added immediately after coagulation of the polyurethane. After the coagulation of the polyurethane, when the coagulated polyurethane is heated, the UV absorber bleeds from the inside of the coagulated polyurethane so that the surface covering effect by the silicone oil is lowered and good light resistance is hardly obtained. For example, in coagulating the polyurethane in water, it is preferable to add the silicone oil before heating for drying the moisture.

To form nap on the surface of the instrument panel surface material, the instrument panel surface material is subjected to napping treatment. The napping treatment can be performed by polishing the instrument panel surface material using sandpaper or a roll sander. In forming nap after the addition of a silicone oil to a sheet, the state of nap may vary due to the slipping effect of the silicone oil. It is preferable to adjust the slipping effect of the silicone oil added. The slipping effect can be appropriately adjusted depending on the kind of the silicone oil and the amount of the silicone oil added.

The instrument panel surface material can be dyed. As for the dyeing method, it is preferable to use a jet dyeing machine because the machine has a kneading effect and can impart flexibility to the instrument panel surface material while dyeing the instrument panel surface material.

The dyeing temperature depends on the type of the fiber, and is preferably 80 to 150° C. When the dyeing temperature is 80° C. or higher, more preferably 100° C. or higher, the fiber can be dyed efficiently. On the other hand, when the dyeing temperature is 150° C. or lower, more preferably 130° C. or lower, deterioration of the polyurethane can be prevented.

The dye can be selected according to the type of the fiber that constitutes the fibrous base material. For example, a disperse dye can be used when the fiber is a polyester fiber, an acid dye or a premetalized dye can be used when the fiber is a polyamide fiber, and a combination thereof can also be used. In the case where the fiber is dyed with a disperse dye, the fiber may be subjected to reduction cleaning after the dyeing.

It is also a preferable aspect to use a dyeing assistant at the time of dyeing. Use of a dyeing assistant can improve the uniformity and reproducibility of dyeing. The fiber may be further subjected to finishing agent treatment using a softening agent, an antistatic agent, a water repellent agent, a flame retardant, a light resisting agent, an antibacterial agent or the like in the same bath as that used for the dyeing or after the dyeing. As described above, a silicone oil can be added during this treatment.

EXAMPLES

In the following, the instrument panel surface material and a method of manufacturing the same will be described in more detail by way of examples, but this disclosure is not limited only to the examples.

Evaluation Method (1) Average Single Fiber Diameter

The average single fiber diameter was obtained by taking a scanning electron microscope (SEM) photograph of a surface of a fibrous base material or an instrument panel surface material at a magnification of 2000 times, randomly selecting 100 pieces of the microfiber, measuring the single fiber diameters of the pieces, and calculating the average of the single fiber diameters.

When the microfiber that constitutes the fibrous base material or the instrument panel surface material has a modified cross-section, the outside diameter of the modified cross-section is calculated as the single fiber diameter. In addition, when a circular cross-section and a modified cross-section are mixed, or when fiber pieces largely different in the single fiber diameter are mixed, 100 pieces in total of samples are selected in accordance with the proportions of the fiber pieces having such cross-sections to calculate the average single fiber diameter. However, when a woven fabric or knitted fabric for reinforcement is inserted in addition to the nonwoven fabric made of a microfiber or microfiber bundles thereof, the fiber of the woven fabric or knitted fabric for reinforcement is excluded from the target of sampling in the measurement of the average single fiber diameter of the microfiber.

(2) Light Fastness

In accordance with the light fastness measurement method of JIS L 0843:2006 (method B, fifth exposure method), a surface material was irradiated with a xenon arc lamp under conditions where the measurement time was adjusted so that the xenon arc intensity might be 110 MJ/m$^2$. The surface material before xenon arc lamp irradiation and the surface material after xenon arc lamp irradiation were compared with each other, and discoloration and fading was evaluated by gray scale evaluation. The surface material was evaluated as grade 1 to grade 5 in increments of 0.5.

(3) Glass Haze

A surface material was heated under the conditions of a heating temperature of 100° C. and a heating time of 20 hours according to the glass haze evaluation method of ISO 6452:2007. As for the glass haze, the shield factor was evaluated using a turbidimeter NDH2000 (manufactured by NIPPON DENSHOKU INDUSTRIES CO., LTD.).

(4) Surface Touch of Surface Material

The surface touch of a surface material was evaluated as follows. A surface of the surface material was stroked by hand of a total of 20 evaluators, that is, 10 healthy adult males and 10 healthy adult females, and the hand was removed. This operation was repeated three times, the surface touch was evaluated by sensory evaluation on a scale of 1 to 5 as described below, and the most frequent evaluation result was adopted as the surface touch. A surface touch evaluation of grade 3 to grade 5 was regarded as an appropriate texture.

Grade 5: The surface material is very smooth.

Grade 4: Evaluation between grade 5 and grade 3.

Grade 3: Although the surface material is caught on the fingertip, it is smooth.

Grade 2: Evaluation between grade 3 and grade 1.

Grade 1: The surface material is rough.

(5) Appearance Quality of Instrument Panel Surface Material

The appearance quality of an instrument panel surface material was evaluated by visual observation and sensory evaluation on a scale of 1 to 5 as described below by a total of 20 evaluators, that is, 10 healthy adult males and 10 healthy adult females, and the most frequent evaluation result was adopted as the appearance quality. An appearance quality evaluation of grade 3 to grade 5 was regarded as good.

Grade 5: The surface material has uniform nap of the fiber, and has a good appearance.

Grade 4: Evaluation between grade 5 and grade 3.

Grade 3: The surface material has slight variation in nap, but has a moderately good appearance.

Grade 2: Evaluation between grade 3 and grade 1.

Grade 1: The surface material has generally uneven nap, and has a poor appearance.

Example 1

Nonwoven Fabric for Fibrous Base Material

A sea-island type composite fiber having a composite ratio of 45% by mass of a sea component to 55% by mass of an island component, a number of islands of 36 islands/1 filament, and an average single fiber diameter of 17 μm was obtained using, as the sea component, polyethylene terephthalate copolymerized with 8 mol % of sodium 5-sulfoisophthalate, and as the island component, polyethylene terephthalate. The obtained sea-island type composite fiber was cut into a staple having a fiber length of 51 mm, the staple was passed on a carding machine and a cross lapper to form a fiber web, and the fiber web was formed into a nonwoven fabric by needle punching. The nonwoven fabric thus obtained was immersed in hot water at a temperature of 98° C. for 2 minutes to shrink, and dried at a temperature of 100° C. for 5 minutes to form a nonwoven fabric (sheet) for fibrous base material.

Addition of Polyvinyl Alcohol

The nonwoven fabric (sheet) for fibrous base material was impregnated with an aqueous polyvinyl alcohol solution having a concentration of 12% by mass and adjusted to a temperature of 50° C., and dried with a dryer at a temperature of 120° C.

Sea Component Removal Treatment

The nonwoven fabric (sheet) for fibrous base material to which polyvinyl alcohol was added was immersed in an aqueous sodium hydroxide solution having a concentration of 10 g/L and heated to a temperature of 95° C. for 30 minutes of treatment to produce a sea-deprived sheet (fibrous base material) that contained a microfiber and that was deprived of the sea component of the sea-island type composite fiber.

Addition of Elastomer

To a DMF (N,N-dimethylformamide) solution of a polycarbonate polyurethane resin adjusted to have a solid content concentration of 12% by mass, a UV absorber having a vapor pressure of 4.7×10 E-6 Pa at 20° C. (manufactured by Tokyo Chemical Industry Co., Ltd.) was added in an amount of 3% by mass relative to the solid content of the polyurethane resin, and the resulting mixture was thoroughly stirred. The mixture was impregnated into the sea-deprived sheet (fibrous base material), and the polyurethane was coagulated in an aqueous solution having a DMF concentration of 30% by mass. Then, polyvinyl alcohol and DMF were removed in water at 70° C., and then the sea-deprived sheet was impregnated with a silicone oil emulsion adjusted to a concentration of 1% by mass so that the amount of the silicone oil added might be 0.1% by mass relative to the total mass of the fiber and polyurethane.

Subsequently, by hot air drying at a temperature of 110° C. for 10 minutes, a sheet material to which the polyurethane resin was added so that the mass of the polyurethane resin relative to the mass of the polyester component in the nonwoven fabric might be 30% by mass was obtained.

Cutting into Halves, Napping, Dyeing, and Reduction Cleaning

The above-mentioned sheet material obtained by adding the polyurethane resin to the fibrous base material was cut into halves in the thickness direction, and a surface of the sheet material reverse to the cut surface was subjected to napping treatment by polishing with endless sandpaper of 240 mesh. Then, the sheet material was dyed with a disperse dye using a circular dyeing machine, followed by reduction cleaning to produce an instrument panel surface material. The microfiber contained in the obtained instrument panel surface material had a single fiber diameter of 3.0 μm.

Evaluation of Surface Material

The obtained instrument panel surface material had a light fastness of grade 4.0 and a glass haze of 9.5%. In addition, the obtained surface material had a surface touch of grade 4, and a good appearance quality of grade 4.

Example 2

Addition of Elastomer

An instrument panel surface material was obtained in the same manner as in Example 1 except that the amount of the UV absorber added was changed to 0.01% by mass.

Evaluation of Surface Material

The obtained instrument panel surface material had a light fastness of grade 3.5 and a glass haze of 9.3%. In addition, the obtained instrument panel surface material had a surface touch of grade 4, and a good appearance quality of grade 4.

Example 3

Addition of Elastomer

An instrument panel surface material was obtained in the same manner as in Example 1 except that the amount of the UV absorber added was changed to 5.0% by mass.

Evaluation of Surface Material

The obtained instrument panel surface material had a light fastness of grade 4.5 and a glass haze of 9.2%. In addition, the obtained instrument panel surface material had a surface touch of grade 4, and a good appearance quality of grade 4.

Example 4

Addition of Elastomer

An instrument panel surface material was obtained in the same manner as in Example 1 except that the UV absorber added was changed to a UV absorber having a vapor pressure of $7.5 \times 10$ E-7 Pa at 20° C. (manufactured by Tokyo Chemical Industry Co., Ltd.).

Evaluation of Surface Material

The obtained instrument panel surface material had a light fastness of grade 4.0 and a glass haze of 6.9%. In addition, the obtained instrument panel surface material had a surface touch of grade 4, and a good appearance quality of grade 4.

Example 5

Addition of Elastomer

An instrument panel surface material was obtained in the same manner as in Example 1 except that the UV absorber added was changed to a UV absorber having a vapor pressure of $2.0 \times 10$ E-10 Pa at 20° C. (manufactured by Tokyo Chemical Industry Co., Ltd.).

Evaluation of Surface Material

The obtained instrument panel surface material had a light fastness of grade 4.0 and a glass haze of 4.7%. In addition, the obtained instrument panel surface material had a surface touch of grade 4, and a good appearance quality of grade 4.

Example 6

Addition of Elastomer

An instrument panel surface material was obtained in the same manner as in Example 1 except that the UV absorber added was changed to a UV absorber having a vapor pressure of $6.0 \times 10$ E-13 Pa at 20° C. (manufactured by Tokyo Chemical Industry Co., Ltd.).

Evaluation of Surface Material

The obtained instrument panel surface material had a light fastness of grade 4.5 and a glass haze of 3.5%. In addition, the obtained instrument panel surface material had a surface touch of grade 4, and a good appearance quality of grade 4.

Example 7

An instrument panel surface material was obtained by a method similar to that in Example 1 except that the number of islands in one filament of the sea-island type fiber obtained in the same manner as in Example 1 was 100. The microfiber contained in the obtained instrument panel surface material had a single fiber diameter of 0.3 μm.

Evaluation of Surface Material

The obtained instrument panel surface material had a light fastness of grade 3.5 and a glass haze of 8.9%. In addition, the obtained surface material had a surface touch of grade 5, and a good appearance quality of grade 3.

Example 8

An instrument panel surface material was obtained by the same method as in Example 1 except that the number of islands in one filament of the sea-island type fiber obtained in the same manner as in Example 1 was 8. The microfiber contained in the obtained instrument panel surface material had a single fiber diameter of 7.0 μm.

Evaluation of Surface Material

The obtained instrument panel surface material had a light fastness of grade 5.0 and a glass haze of 9.1%. In addition, the obtained instrument panel surface material had a surface touch of grade 3, and a good appearance quality of grade 3.

Example 9

Addition of Elastomer

Polyurethane was coagulated in the same manner as in Example 1. Then, an instrument panel surface material was obtained in the same manner as in Example 1 except that after polyvinyl alcohol and DMF were removed in water at 70° C., the sea-deprived sheet was impregnated with a silicone oil emulsion adjusted to a concentration of 2% by mass so that the amount of the silicone oil added might be 5.0% by mass relative to the total mass of the fiber and polyurethane.

Evaluation of Surface Material

The obtained instrument panel surface material had a light fastness of grade 4.0 and a glass haze of 9.2%. In addition, the obtained instrument panel surface material had a surface touch of grade 3, and a good appearance quality of grade 4.

Example 10

Addition of Elastomer

Polyurethane was coagulated in the same manner as in Example 1. Then, an instrument panel surface material was obtained in the same manner as in Example 1 except that after polyvinyl alcohol and DMF were removed in water at 70° C., the sea-deprived sheet was impregnated with a silicone oil emulsion adjusted to a concentration of 0.05% by mass so that the amount of the silicone oil added might be 0.01% by mass relative to the total mass of the fiber and polyurethane.

Evaluation of Surface Material

The obtained instrument panel surface material had a light fastness of grade 3.5 and a glass haze of 9.9%. In addition, the obtained instrument panel surface material had a surface touch of grade 4, and a good appearance quality of grade 4.

Example 11

Addition of Elastomer

Polyurethane was coagulated in the same manner as in Example 1. Then, polyvinyl alcohol and DMF were removed in water at 70° C., and no silicone oil was added.

Cutting into Halves, Napping, Dyeing, and Reduction Cleaning

An instrument panel surface material was obtained in the same manner as in Example 1 except that after the sheet material was cut into halves in the thickness direction, subjected to napping treatment, then dyed with a disperse dye using a circular dyeing machine, followed by reduction cleaning, as finishing agent treatment, a silicone oil emulsion was added to the sheet material so that the amount of the silicone oil added might be 0.1% by mass relative to the total mass of the fiber and polyurethane.

Evaluation of Surface Material

The obtained instrument panel surface material had a light fastness of grade 3.5 and a glass haze of 9.5%. In addition, the obtained instrument panel surface material had a surface touch of grade 3, and a good appearance quality of grade 4.

Comparative Example 1

Addition of Elastomer

An instrument panel surface material was obtained in the same manner as in Example 1 except that the UV absorber added was changed to a UV absorber having a vapor pressure of 1.5×10 E-4 Pa at 20° C. (manufactured by Tokyo Chemical Industry Co., Ltd.).

Evaluation of Surface Material

The obtained surface material had a light fastness of grade 3.0 and a glass haze of 12.0%, and was not usable as an instrument panel. In addition, the obtained instrument panel surface material had a surface touch of grade 4, and an appearance quality of grade 4.

Comparative Example 2

Nonwoven fabric for fibrous base material, and sea component removal treatment

Addition of Elastomer

Polyurethane was coagulated in the same manner as in Example 1 except that the UV absorber added was changed to a UV absorber having a vapor pressure of 1.5×10 E-4 Pa at 20° C. (manufactured by Tokyo Chemical Industry Co., Ltd.). Then, an instrument panel surface material was obtained in the same manner as in Example 1 except that after polyvinyl alcohol and DMF were removed in water at 70° C., no silicone oil was added.

Evaluation of Surface Material

The obtained surface material had a light fastness of grade 3.0 and a glass haze of 18.0%, and was not usable as an instrument panel. In addition, the obtained instrument panel surface material had a surface touch of grade 4, and an appearance quality of grade 4.

Comparative Example 3

An instrument panel surface material was obtained by the same method as in Example 1 except that the number of islands in one filament of the sea-island type fiber obtained in the same manner as in Example 1 was 6. The microfiber contained in the obtained instrument panel surface material had a single fiber diameter of 7.2 μm.

Evaluation of Surface Material

The obtained instrument panel surface material had a light fastness of grade 5.0 and a glass haze of 9.6%, but had a surface touch of grade 2 and an appearance quality of grade 2. Thus, no good surface condition was obtained.

Comparative Example 4

An instrument panel surface material was obtained by the same method as in Example 1 except that the number of islands in one filament of the sea-island type fiber obtained in the same manner as in Example 1 was 150. The microfiber contained in the obtained instrument panel surface material had a single fiber diameter of 0.2 μm.

Evaluation of Surface Material

The obtained instrument panel surface material had a light fastness of grade 3.0, and was not usable as an instrument panel. The glass haze was 8.8%. The obtained instrument panel surface material had a surface touch of grade 4, and an appearance quality of grade 2.

The evaluation results of the instrument panel surface materials obtained in the examples and comparative examples are summarized in Table 1.

TABLE 1

| | Average single fiber diameter (μm) | UV absorber Vapor pressure at 20° C. (Pa) | % by mass | Silicone oil (% by mass) | Light fastness (Grade) | Glass haze (%) | Surface touch (Grade) | Appearance quality (Grade) |
|---|---|---|---|---|---|---|---|---|
| Example 1 | 3.0 | 4.7 × 10 E−6 | 3.0 | 0.1 | 4.0 | 9.5 | 4 | 4 |
| Example 2 | 3.0 | 4.7 × 10 E−6 | 0.01 | 0.1 | 3.5 | 9.3 | 4 | 4 |
| Example 3 | 3.0 | 4.7 × 10 E−6 | 5.0 | 0.1 | 4.5 | 9.2 | 4 | 4 |
| Example 4 | 3.0 | 7.5 × 10 E−7 | 3.0 | 0.1 | 4.0 | 6.9 | 4 | 4 |
| Example 5 | 3.0 | 2.0 × 10 E−10 | 3.0 | 0.1 | 4.0 | 4.7 | 4 | 4 |
| Example 6 | 3.0 | 6.0 × 10 E−13 | 3.0 | 0.1 | 4.5 | 3.5 | 4 | 4 |

TABLE 1-continued

|  | Average single fiber diameter (μm) | UV absorber Vapor pressure at 20° C. (Pa) | % by mass | Silicone oil (% by mass) | Light fastness (Grade) | Glass haze (%) | Surface touch (Grade) | Appearance quality (Grade) |
|---|---|---|---|---|---|---|---|---|
| Example 7 | 0.3 | $4.7 \times 10\text{E}{-}6$ | 3.0 | 0.1 | 3.5 | 8.9 | 5 | 3 |
| Example 8 | 7.0 | $4.7 \times 10\text{E}{-}6$ | 3.0 | 0.1 | 5.0 | 9.1 | 3 | 3 |
| Example 9 | 3.0 | $4.7 \times 10\text{E}{-}6$ | 3.0 | 5.0 | 4.0 | 9.2 | 3 | 4 |
| Example 10 | 3.0 | $4.7 \times 10\text{E}{-}6$ | 3.0 | 0.01 | 3.5 | 9.9 | 4 | 4 |
| Example 11 | 3.0 | $4.7 \times 10\text{E}{-}6$ | 3.0 | 0.1 | 3.5 | 9.5 | 3 | 4 |
| Comparative Example 1 | 3.0 | $1.5 \times 10\text{E}{-}4$ | 3.0 | 0.1 | 3.0 | 12.0 | 4 | 4 |
| Comparative Example 2 | 3.0 | $1.5 \times 10\text{E}{-}4$ | 3.0 | None | 3.0 | 18.0 | 4 | 4 |
| Comparative Example 3 | 7.2 | $4.7 \times 10\text{E}{-}6$ | 3.0 | 0.1 | 5.0 | 9.6 | 2 | 2 |
| Comparative Example 4 | 0.2 | $4.7 \times 10\text{E}{-}6$ | 3.0 | 0.1 | 3.0 | 8.8 | 4 | 2 |

The invention claimed is:

1. An automobile instrument panel surface material, comprising:
   a microfiber having an average single fiber diameter of 0.3 to 7 μm; and
   polyurethane containing a UV absorber having a vapor pressure of $5.0 \times 10\text{E}{-}6$ Pa or less at 20° C.; and
   0.01 to 0.1% by mass of a silicone oil in mass percentage relative to a total mass of the microfiber and the polyurethane,
   wherein the polyurethane containing the UV absorber is coated with the silicone oil and does not contain the silicone oil, and
   wherein the automobile instrument panel surface material has 1) a content of the UV absorber of 0.01 to 5% by mass in mass percentage relative to the polyurethane, 2) nap formed of the microfiber,
   3) light fastnesses measured according to a light fastness measurement method of JIS L 0843:2006 under conditions of a xenon arc intensity of 110 MJ/m$^2$, a fading by gray scale evaluation of grade 3.5 or higher, and
   4) a glass haze of 10.0% or less as measured according to a glass haze evaluation method of ISO 6452:2007 under conditions of a heating temperature of 100° C. and a heating time of 20 hours.

2. The automobile instrument panel surface material according to claim 1, wherein the polyurethane is polycarbonate polyurethane.

3. The automobile instrument panel surface material according to claim 1, wherein the UV absorber has a vapor pressure of $1.0 \times 10\text{E}{-}7$ Pa or less at 20° C.

4. A method of manufacturing the automobile instrument panel surface material according to claim 1, the method comprising:
   adding a UV absorber having a vapor pressure of $1.0 \times 10\text{E}{-}7$ Pa or less at 20° C. to the polyurethane;
   a polyurethane impregnating and adding step of impregnating and adding, to a fibrous base material containing a microfiber, the polyurethane containing the UV absorber added thereto; and after the polyurethane impregnating and adding step, and
   adding to the fibrous base material to which the polyurethane is impregnated and added a silicone oil in an amount of 0.01 to 0.1% by mass in mass percentage relative to a total mass of the microfiber and the polyurethane,
   wherein the automobile instrument panel surface material has a content of the UV absorber of 0.01 to 5% by mass in mass percentage relative to the polyurethane.

5. A method of manufacturing the automobile instrument panel surface material according to claim 2, the method comprising:
   adding a UV absorber having a vapor pressure of $1.0 \times 10\text{E}{-}7$ Pa or less at 20° C. to the polyurethane;
   a polyurethane impregnating and adding step of impregnating and adding, to a fibrous base material containing a microfiber, the polyurethane containing the UV absorber added thereto; and after the polyurethane impregnating and adding step, and
   adding to the fibrous base material to which the polyurethane is impregnated and added a silicone oil in an amount of 0.01 to 0.1% by mass in mass percentage relative to a total mass of the microfiber and the polyurethane,
   wherein the automobile instrument panel surface material has a content of the UV absorber of 0.01 to 5% by mass in mass percentage relative to the polyurethane.

6. A method of manufacturing the automobile instrument panel surface material according to claim 4, the method comprising:
   adding a UV absorber having a vapor pressure of $1.0 \times 10\text{E}{-}7$ Pa or less at 20° C. to the polyurethane;
   a polyurethane impregnating and adding step of impregnating and adding, to a fibrous base material containing a microfiber, the polyurethane containing the UV absorber added thereto; and after the polyurethane impregnating and adding step, and
   adding to the fibrous base material to which the polyurethane is impregnated and added a silicone oil in an amount of 0.01 to 0.1% by mass in mass percentage relative to a total mass of the microfiber and the polyurethane,
   wherein the automobile instrument panel surface material has a content of the UV absorber of 0.01 to 5% by mass in mass percentage relative to the polyurethane.

* * * * *